US008635558B2

United States Patent
Deguy

(10) Patent No.: US 8,635,558 B2
(45) Date of Patent: Jan. 21, 2014

(54) METHOD AND DEVICE FOR GENERATING A PROCEDURAL MAP FROM AN EXTERNAL PARAMETER SUCH AS AN IMAGE CHARACTERISTIC

(75) Inventor: Sebastien Deguy, Clermont-Ferrand (FR)

(73) Assignee: Allegorithmic, Aubiere (FR)

( * ) Notice: Subject to any disclaimer, the term of this patent is extended or adjusted under 35 U.S.C. 154(b) by 1135 days.

(21) Appl. No.: 11/568,025

(22) PCT Filed: Apr. 13, 2005

(86) PCT No.: PCT/EP2005/003872
§ 371 (c)(1),
(2), (4) Date: Aug. 20, 2008

(87) PCT Pub. No.: WO2005/114588
PCT Pub. Date: Dec. 1, 2005

(65) Prior Publication Data
US 2009/0044149 A1 Feb. 12, 2009

(30) Foreign Application Priority Data
Apr. 19, 2004 (FR) .................................. 04 04238

(51) Int. Cl.
*G06K 15/00* (2006.01)
(52) U.S. Cl.
USPC .......................................... 715/854; 715/708
(58) Field of Classification Search
USPC ................. 715/853–855, 708–712, 736–738, 715/771–772
See application file for complete search history.

(56) References Cited

U.S. PATENT DOCUMENTS

| 5,060,169 A | 10/1991 | Khosla |
| 5,680,475 A | 10/1997 | Zwierski et al. |
| 6,301,370 B1 * | 10/2001 | Steffens et al. ............... 382/103 |
| 6,687,404 B1 * | 2/2004 | Hull et al. ..................... 382/226 |
| 6,738,062 B1 * | 5/2004 | Moreton ........................ 345/423 |
| 7,917,888 B2 * | 3/2011 | Chong et al. .................. 717/102 |
| 2003/0110177 A1 * | 6/2003 | Andrei et al. ................. 707/100 |
| 2004/0049309 A1 * | 3/2004 | Gardner et al. ............... 700/132 |
| 2004/0078182 A1 * | 4/2004 | Nixon et al. ..................... 703/22 |
| 2005/0005266 A1 * | 1/2005 | Datig ............................. 717/136 |
| 2005/0038774 A1 * | 2/2005 | Lillibridge et al. ............... 707/1 |

OTHER PUBLICATIONS

Deguy, et al.: "Classification of Texture Images Using Multi-Scale Statistical Estimators of Fractal Parameters" XP008033243.
Deguy, et al.: "A Flexible Noise Model for Designing Maps" XP008033245.
International Search Report, PCT/EP2005/003872, Jul. 15, 2005.

* cited by examiner

Primary Examiner — Steven Sax
(74) Attorney, Agent, or Firm — BCF LLP

(57) ABSTRACT

Method to generate a procedural map (50) having a tree structure (40) comprising a plurality of levels (43), each one with at least one node (41) to which is associated at least one parameter, comprising the steps consisting in:
providing a tool for parameter setting adapted to parameterize the tree corresponding to the map to provide and adapted to be connected to at least one external source of parameters;
receiving, via the tool for parameter setting (or generation of procedural maps) the parameters of the map to be provided;
at least one of said parameters coming from an external source;
processing said parameters, in order to generate said map;
Such a map comprises parameters and a structure allowing it to provide "special" effects in the field of image processing. The invention further provides a tool for generation and/or modification for the implementation of said method.

7 Claims, 19 Drawing Sheets

METHOD AND DEVICE FOR GENERATING A PROCEDURAL MAP FROM AN EXTERNAL PARAMETER SUCH AS AN IMAGE CHARACTERISTIC

The present invention relates to a method as well as the tools allowing creating and/or modifying procedural maps, in particular for image processing from an external parameter such as the characteristic of a basis image.

Many tools for image processing are known today. However, known tools allow to carry out visual effects in a global manner, in general on an entire image, in an homogeneous way. Thus, the effect is provided in a uniform intensity on the entire processed portion.

This situation is often imperfect, in particular when one wishes to carry out complex or more realistic effects, etc. In such cases, the users have access to visual effects map libraries, allowing to carry out the usual effects. In this case, it is not possible to locally control the process, nor to proceed to corrections, since everything is managed by the selected maps.

Otherwise, it is necessary to proceed manually, which is often long and tiresome.

To overcome these various disadvantages, the present invention provides a process to generate or modify a procedural map (50) with a tree structure (40) comprising a plurality of levels (43), each one with at least one node (41) to which is associated at least one parameter, comprising the steps consisting in:

establishing an at least temporary connection with an external source capable to provide at least one value of at least one parameter potentially applicable to a procedural map;

parameterizing a procedural map with the sub-steps consisting in:

providing a node selection tool (20), allowing the selection of at least one node (41; 51) of at least one level (43; 52);

receiving the selection of at least one node, of at least one level to which the parameters are intended;

providing a parameter modification tool (30) allowing the modification of at least one parameter (31, 32, 3, 34, 5, 36) of the at least one selected node, starting from an external source;

applying said value of the external parameter to the selected portion of the map;

generating the map according to at least the value of this external parameter.

According to said method, a new map can be generated either starting from an already existing map, or without a starting map. The user thus has a total flexibility. The fact of being able to obtain and use one or more external parameters to configure a map is particularly advantageous. Thus for example, if one uses the color intensity of a digital image, the map thus created can be directly influenced by the composition, the form or the structure of this image. If one chooses for example a color strongly present on an image, the contour or basic form of the map can evoke or more or less strongly suggest the content of the basic image. This aspect thus gives to the user quasi-infinite working possibilities.

In addition, the tree structure of the map alloys improving or modifying the map locally.

The possibility to carrying out local modifications, i.e. at the level of only one or several nodes, is due to the fact that the map is arranged or structured as a tree. Such a structure alloys to act locally, for example at the level of a node or a branch or portions of branches, without affecting the remainder of the nodes or branches. In an advantageous way, it is also possible to choose that the modifications are recursive or not. The method and the tools according to the invention preferably alloy to act locally or on an entire map. A selector "local or global mode" advantageously alloys to choose the preferred mode of operation.

Preferably, the process also includes the steps consisting in:

receiving a selection of at least a parameter of said node to be modified;

applying said value of the external parameter to this at least one node;

processing said parameters, including the modified parameter, in order to generate said modified map.

In a preferred way, an external source can be selected among the list comprising: an image, a sound, a physical value. It may also be a value of current intensity, a magnetic field, a force, a temperature, etc. The possibilities of external sources are thus particularly vast. The various parameters alloying to provide an image, such as the color levels (in particular green, blue and red), brightness, the gradient, etc, are particularly advantageous with the method according to the invention.

According to an advantageous embodiment, the method also comprises the step consisting in providing at least one accessor, capable to ensure compatibility between the parameter of the external source and the parameter of the source to be modified.

The accessor can, for example, modify or adapt the format of the parameter coming from the external source in order for this format or type to be compatible with the parameter of the tree on which this external parameter is planned to be applied. The used accessors are advantageously known type accessors. For example, an accessor can receive an external parameter corresponding to the level of red, green or blue. It is then a question of adapting the scale, for example 0 to 250, for a scale of color, to a scale between 0 and 1 for a tree parameter such as H or P, a scale expressed as a percentage for Dx or Dy, etc.

In addition to the traditional accessors, the invention can also use moments of order N (discrete or continuous), differential operators (discrete or continuous). These two families are in fact the heart or the principal element of many accessor examples.

According to an advantageous embodiment, said map thus produced is a map for image processing.

Such a map for image processing is thus likely to be used to process or modify at least an image or a series of images, such as for example a video sequence.

Advantageously, a map generated or modified according to the present method is modifiable locally.

Advantageously, the process further comprises the steps consisting in:

receiving a selection of at least another node, from at least one level;

receiving a selection of at least one parameter of this or these other nodes;

applying a new value for these nodes;

generating the map according at least to these values.

Advantageously, the selector alloying to select the nodes and/or the parameters, is actionable by a command means (such as software, a machine, etc). In this way, it is possible to generate or to modify a map according on one hand to external parameters, and on the other hand using parameters provided by the user or by autonomous means such as software, machines, etc.

According to an embodiment, a procedural map with a tree structure can advantageously be represented by an equation of the type:

$$\Sigma F(2^j x - k)$$

$(j, k) \in T$ in which:
- F is a function (or morphlet) $R^n \to R$
- x is a vector of the type (x1, x2, ..., xn);
- T is a tree comprising nodes (j, k) and in which
  - j represents the selected level, among a total number of potential levels jmax (j∈(0, 1, 2, ..., jmax)
  - k is a displacement vector for each node N, of the type (x1, x2, ..., xn).

According to an embodiment, the modifiable parameters are advantageously selected in the list comprising: a morphlet F, the maximum number of levels (jmax).

According to another embodiment, a map is likely to be represented by an equation of the type:

$$\Sigma 2^{-jH} F(2^j x - k) \xi_{(j,k)}$$

$(j, k) \in T_{D, p}$ in which:
- F is a function (or morphlet) $Rn \to R$
- x is a vector of the type (x1, x2, ..., xn);
- $T_{D, p}$ represents a tree provided with an intermittency parameter (p), comprising nodes (j, k), and a displacement value (D), in which:
  - j indicates the selected level, among a total number of potential levels jmax j∈(0, 1, 2, ..., jmax)
  - k is a displacement vector for each node N of the type (x1, x2, ..., xn)
- H represents a roughness value;
- ξ represents a random number.

According to another advantageous embodiment, the modifiable parameters are selected in the list comprising: a morphlet F, the maximum number of levels (jmax), the Hurst parameter (H), a random number (ξ), an intermittency parameter (p), a displacement value (D).

The sum is advantageously a generalized sum. Any type of operation or function can thus be used, such as for example subtraction, multiplication, maximum or minimum functions, etc.

The parameters can advantageously be affected in a recursive way to the children nodes of the selected nodes.

A map can advantageously be time dependant.

The invention also provides a tool for the generation or modification of procedural maps for the implementation of the method presented above, allowing the generation or the modification of procedural maps having a tree structure, comprising a plurality of levels each one with at least one node with which at least one parameter is associated, comprising:
- a means for at least temporary connection to at least one external source of parameter;
- a node selection tool allowing the selection of at least one node of one level;
- a map parameter selection and modification tool, for on the one hand selecting a parameter to be modified, and on the other hand allowing the input of the new parameter value;
- a processing unit (calculator or microprocessor) intended to process said parameters (those modified as well as the unchanged ones), in order to generate said modified image processing map;
- operating instructions, to ensure the tool operation and in particular the processing unit operation;
- an output, allowing to transmit the modified map.

Said procedural map generation or modification tool preferably comprises at least one accessor, capable to receive the external parameter and to ensure compatibility between the external parameters and the tree parameters to be generated.

Advantageously, the parameter selection and modification tool comprises, for at least one parameter, a selector, in order to allow choosing the origin of the tree parameter to be generated.

This origin can be of two principal sources: external, such as for example a parameter of an image, a sound, a parameter related to time or to a current or electric impulse, a vibration, a physical value such as the temperature, speed, power or force, etc. A parameter can also be set or modified by a user, using a tool allowing allotting or modifying a value, such as a cursor, an adjustment button, a pull-down menu, etc The invention also provides a tool for generation or modification of procedural maps for the implementation of the above mentioned method, and allowing the generation or the modification of procedural maps having a tree structure, comprising a plurality of levels, each one with at least one node with which at least one parameter is associated, comprising:
- a map parameter input unit, to receive at least one parameter coming from at least one object or external source,
- a processing unit provided to process said parameters, in order to generate said processing map so that the map has a tree structure;
- operating instructions, to ensure the operation of the tool and in particular of the processing unit;
- an output, allowing to transmit the generated maps.

According to an advantageous embodiment, said procedural map generation tool comprises at least one accessor, capable to receive said external parameter.

Advantageously, said accessor transforms said external parameter in order to be compatible with the tree parameter that it must generate.

Advantageously, said parameter selection and modification tool comprises, for at least one parameter, a selector, in order to alloy choosing the origin of the parameter of the tree to be generated. Depending on the configuration, the user can then choose, either for only one, or for a plurality of parameters, to set a value of his choice (a user value) by means of an internal tool (such as a cursor, a roller, a pull-down menu, etc), or to set a value coming from an object or external source, such as for example a digital image.

Advantageously, the node selection tool comprises a unit for depth selection, alloying to select the extent of the modification to be made on the tree.

According to an advantageous embodiment, the node selection tool comprises a node-object or node localization mobile framework. Said framework can be operated by a cursor directly from the working interface.

The invention will be now described in reference to the attached FIGS. 1 to 8, only presented to be used as non limitative examples, in which.

FIGS. 9 to 14 schematically illustrate the principles and the parameters used for procedural maps having a tree structure;

FIGS. 15 to 19 illustrate very simple examples of procedural maps showing the effect of a tree structure;

FIGS. 20 to 23 illustrate simple examples showing the types of local modifications that the invention allow to provide.

Figure 1:
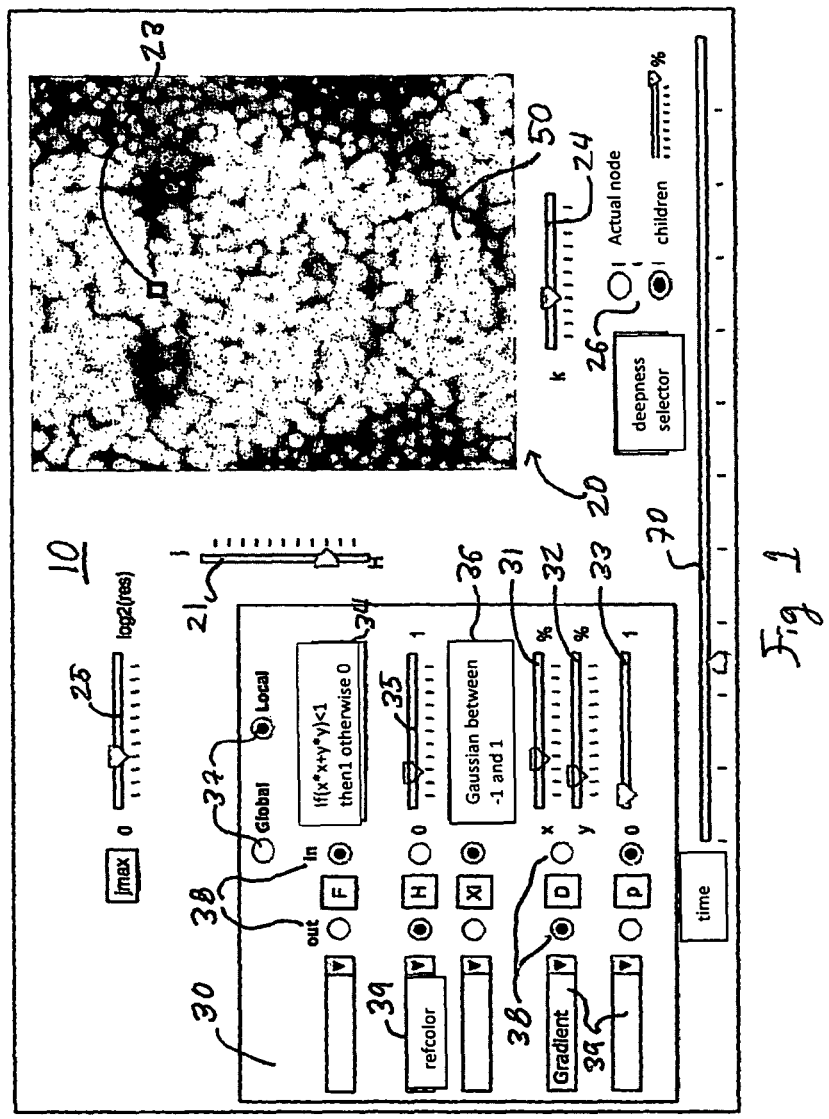
FIG. 1 illustrates an example of working interface in accordance with the method and the tools of the invention.
Figure 2:
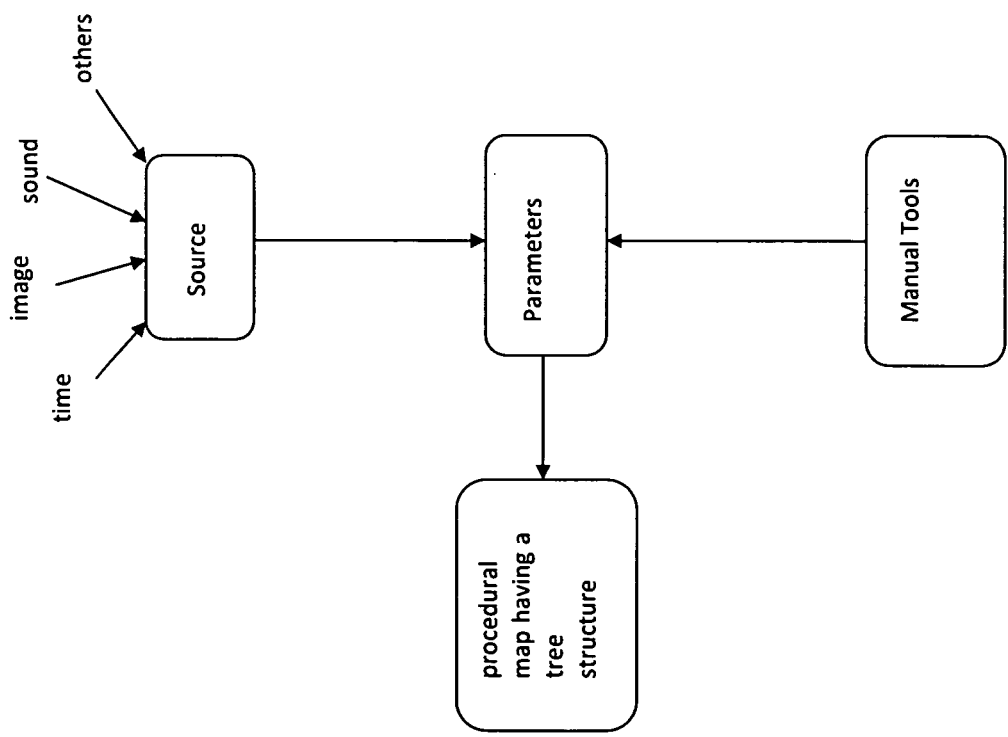
FIG. 2 illustrates the basic principle of the method according to the invention.
Figure 3:
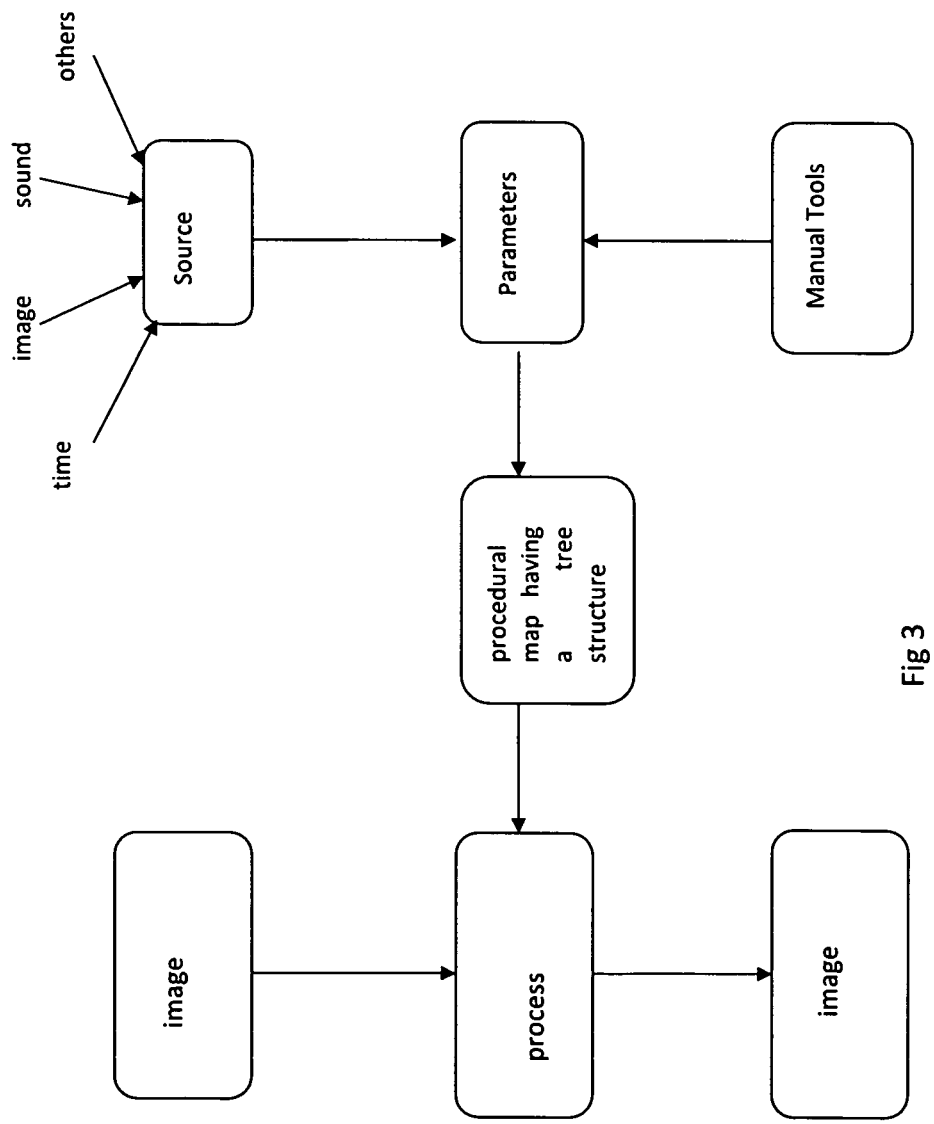
FIG. 3 illustrates the basic principle of an example of application of a procedural map made due to the invention.

FIG. 1 presents an example of interface for the implementation of the method and the device according to the invention.

Figure 9:
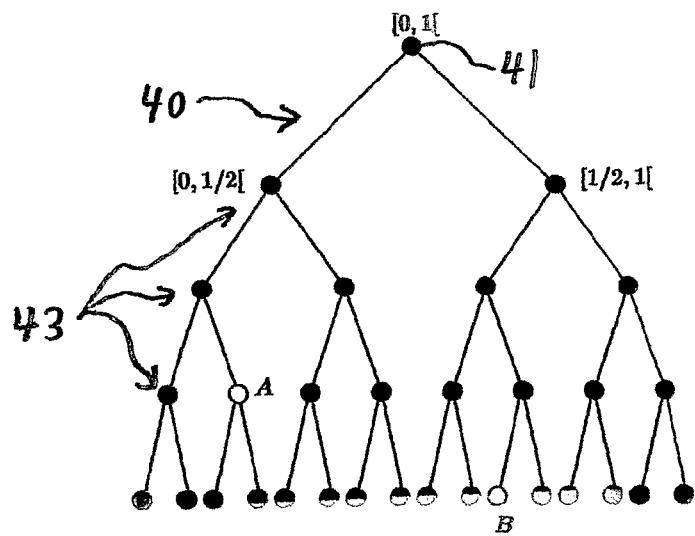
Figure 10:
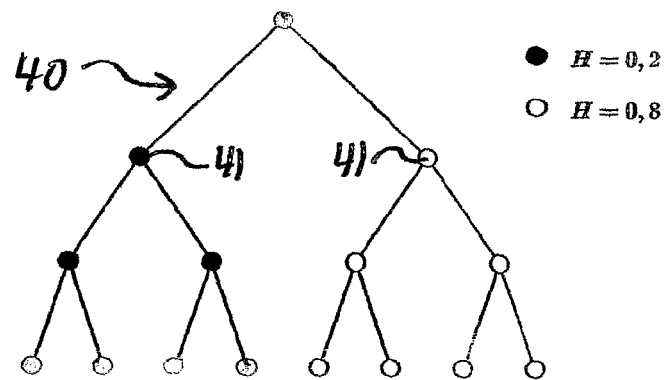
Figure 11:
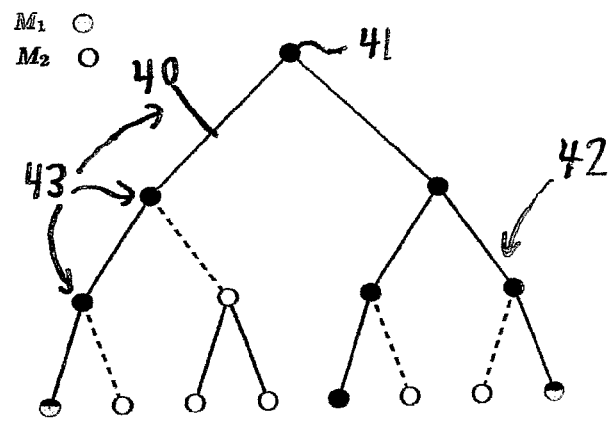

The present invention is based on the use of procedural maps having a tree structure. FIGS. 9 to 14 illustrate examples of such trees (for the specific case in which n=1, where N is the dimension of the support. For example, n=2 for an image, n=3 for a volume, n=1 for a curve). In the example of FIG. 9, with j=0, one finds a simple node. Two children or son nodes are on the level j=1, and four on the level j=2. All the nodes are similar. The function F has an important contribution to the definition of the basic form of the node-object. It is also indicated in this document by the term "morphlet". A morphlet can practically take any form. Such a procedural map having a tree structure can be represented by the following equation:

$$\sum_j \sum_k F(2^j x - k), (j, k)$$

forming a tree T, and also represented in this document by:

$$\sum F(2^j x - k)$$

$(j, k) \in T$ in which:

F is a function or morphlet $R^n \rightarrow R$ x is a vector of the type $(x1, x2, \ldots, xn)$;

T is a tree including nodes $(j, k)$ and in which j indicates the current level, among a total potential number of levels jmax $(J \in (0, 1, 2, \ldots, jmax)$;

k is a displacement vector for each node N and of the type $(x1, x2, \ldots, xn)$.

FIGS. 9 to 14 illustrate examples of local modifications which it is possible to provide due to the tree structure according to the invention. For example, on FIG. 10, different values for H were set. Thus, the half tree on the left of FIG. 10 comprises a value of H of 0.2; that of right-hand side, a value of H of 0.8. The tree is symmetrical but the invention enables to produce unsymmetrical trees. This type of modification may allow to locally modify the level of roughness of a map: while tending towards H=1 a surface will be smoother; while tending towards H=0, a surface will be rougher.

Figure 12:
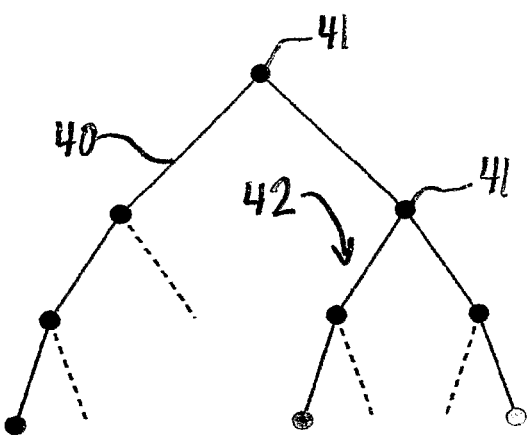

On FIG. 12, certain sub-trees or branches are removed. The parameter P represents a probability of removing branches from a tree. With p=0.2, there is a probability of 0.2 to remove branches; for p=0.8, this probability is of 0.8. This parameter can be adjusted to preserve or not a high density of sub-trees.

Figure 13:
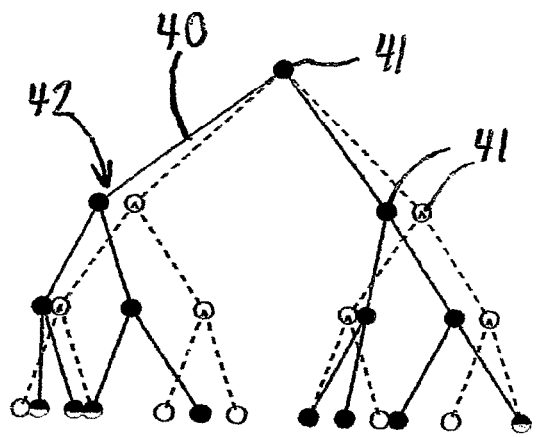

FIG. 13 illustrates the possibilities offered by the parameter D, that is to say the shift. The shift enables to move one or more nodes from their original positions.

Figure 14:
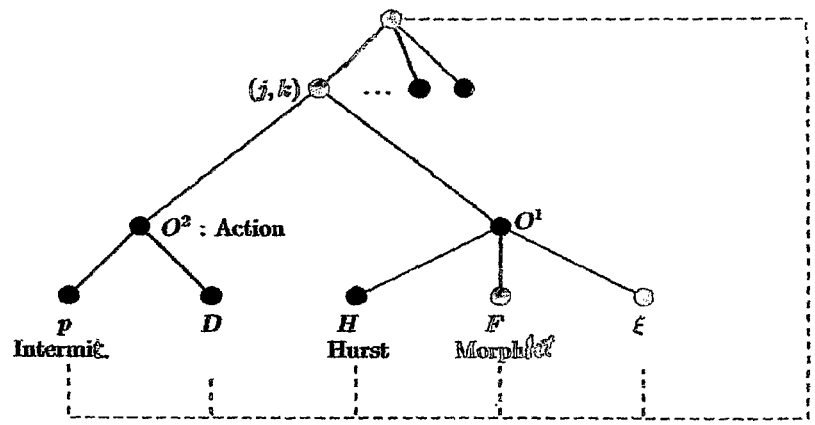

Lastly, FIG. 14 illustrates the main types of parameters with which the invention allows to work to create or modify procedural maps: action parameters such as p and D, and structure parameters, such as H, F and ξ.

Figure 15:
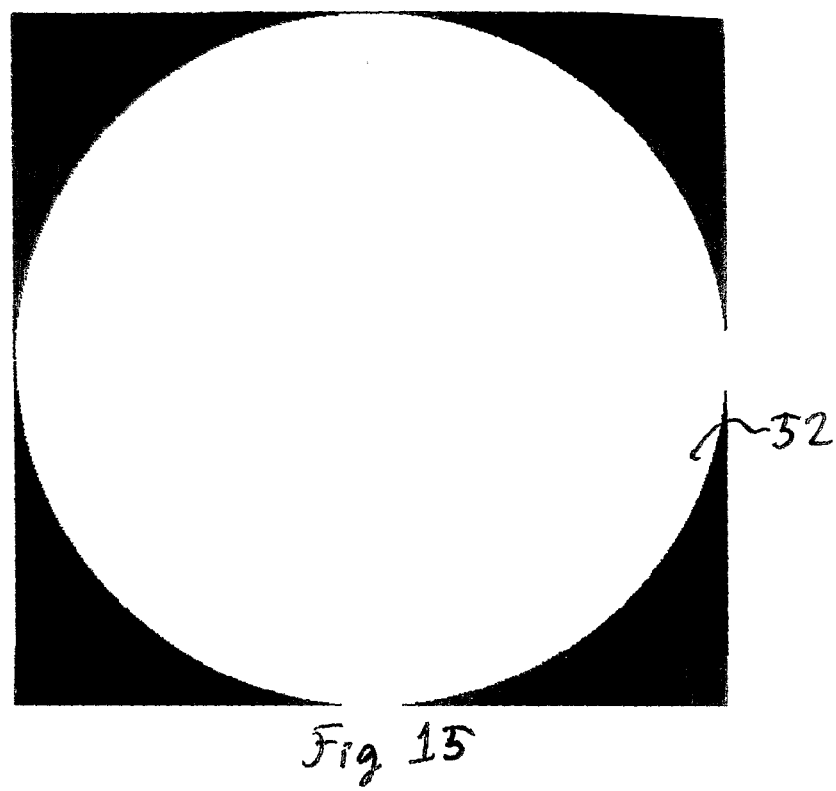

FIGS. 15 to 19 illustrate examples of procedural maps having tree structures. For example, FIG. 1 presents an example in which a morphlet of the type F=1, if X2+y2<1, otherwise, F=0. With j=0, with a single node, a single node-object NO is generated, having the shape of a uniform and centered disc (FIG. 15).

Figure 16:
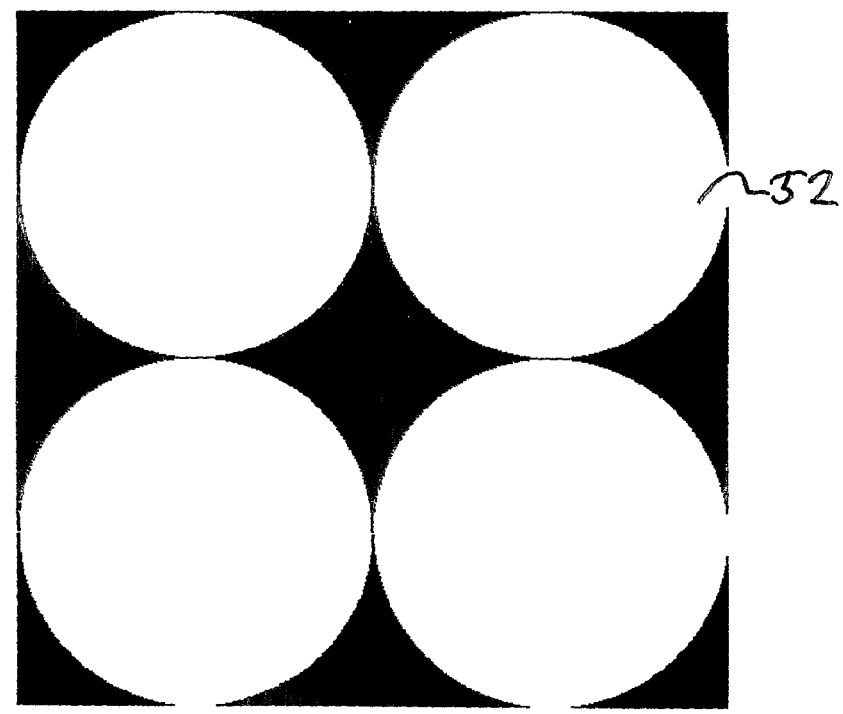
Figure 17:
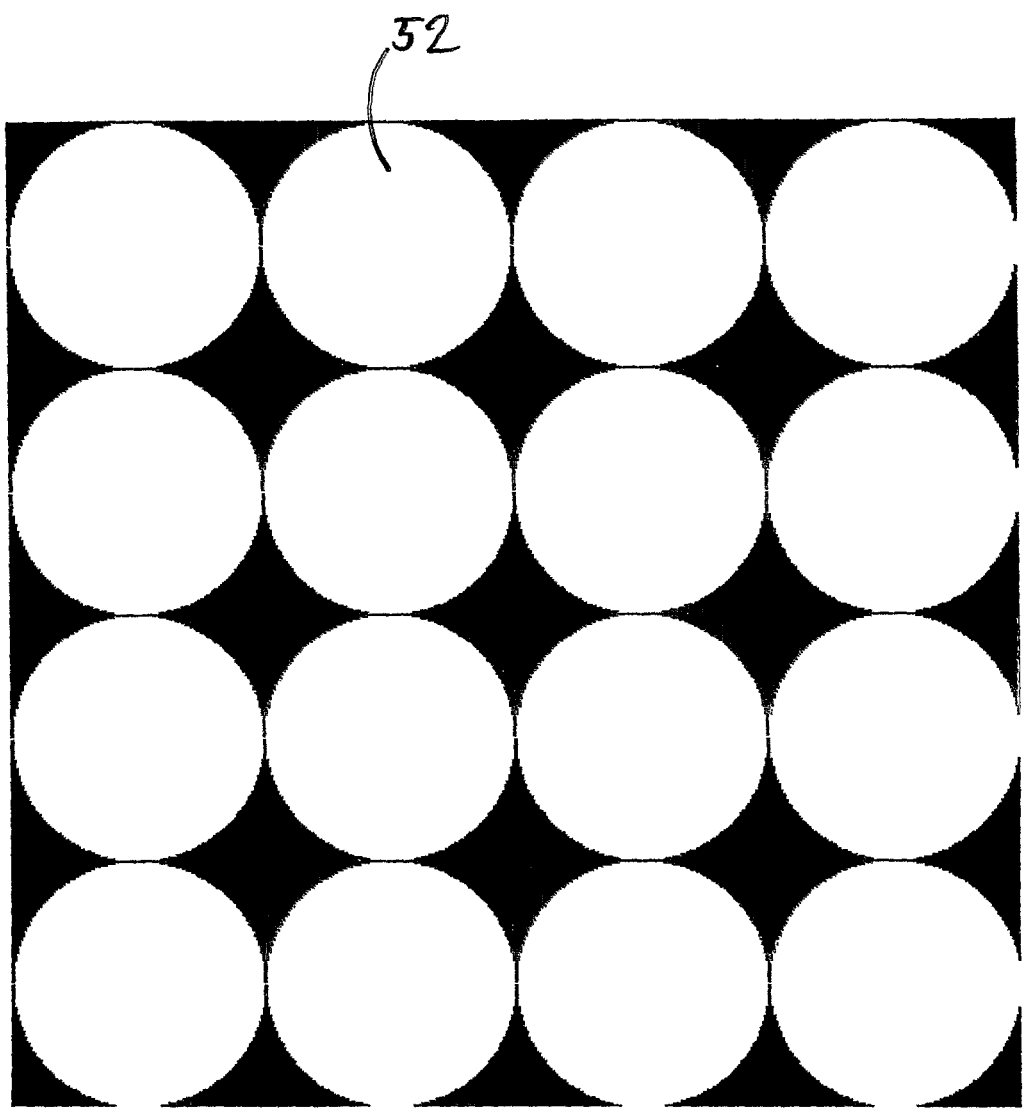

For j=1, on the second level, FIG. 16, one finds four node-objects, in this example, four discs of smaller size, each one being uniform. This layer is thus divided into four sections, each one forming a node-object. Each section occupies ¼ of the initial map, according to the quadratic and uniform arrangement of this example. One thus sees the effect of the main parameters: j indicates the current level; k allows the displacement of node-objects, in this example from the center of the map towards the center of one of the quarters. The morphlet basic F remains unchanged.

The following figure (FIG. 17) illustrates the 3rd level (j=2), for a similar morphlet. From the preceding level, there is a new subdivision in four quarters, each quarter having its node-object, in this example, a similar disc, but becoming smaller and smaller.

Figure 18:
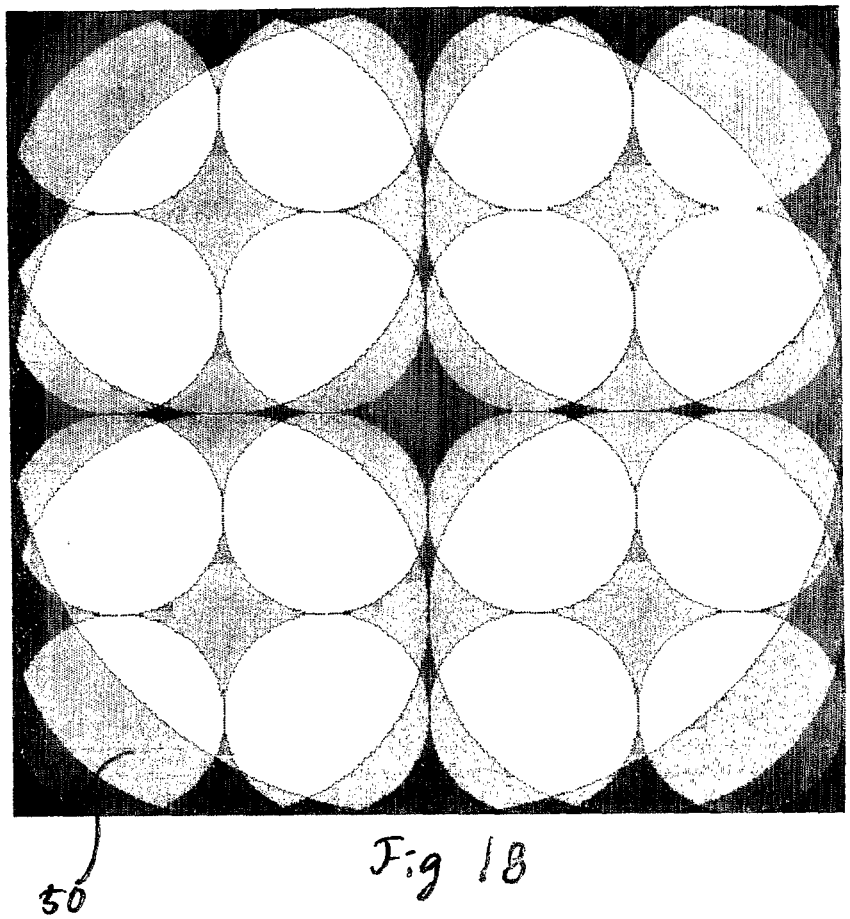
Figure 19:
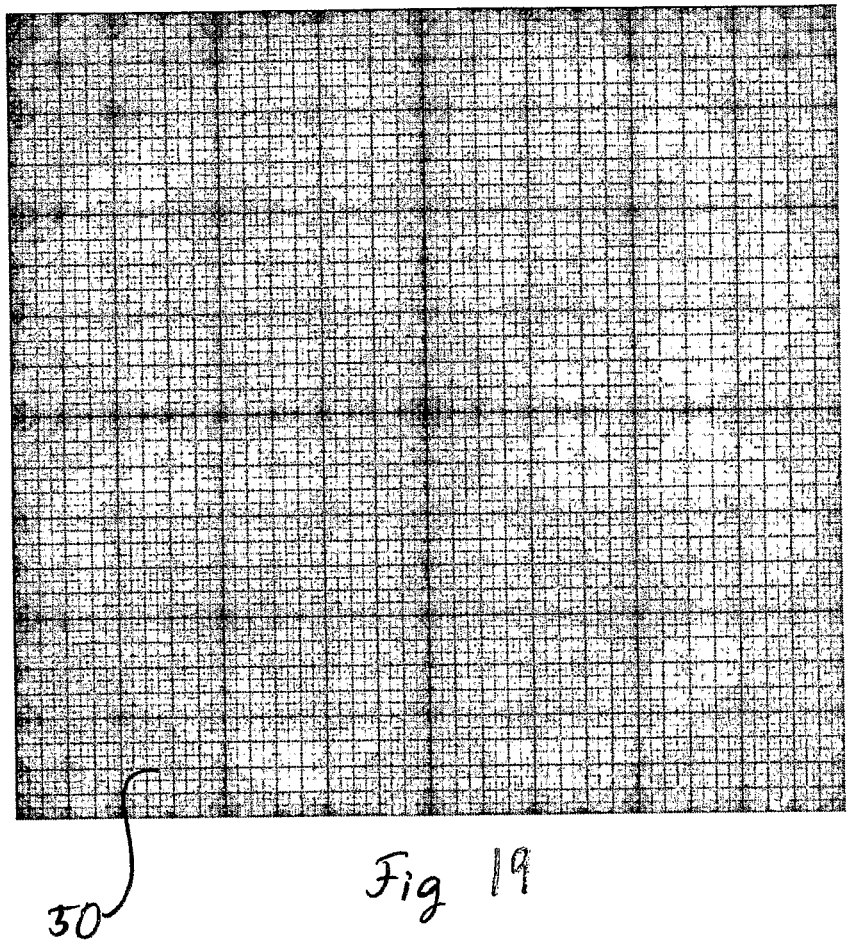
Figure 20:
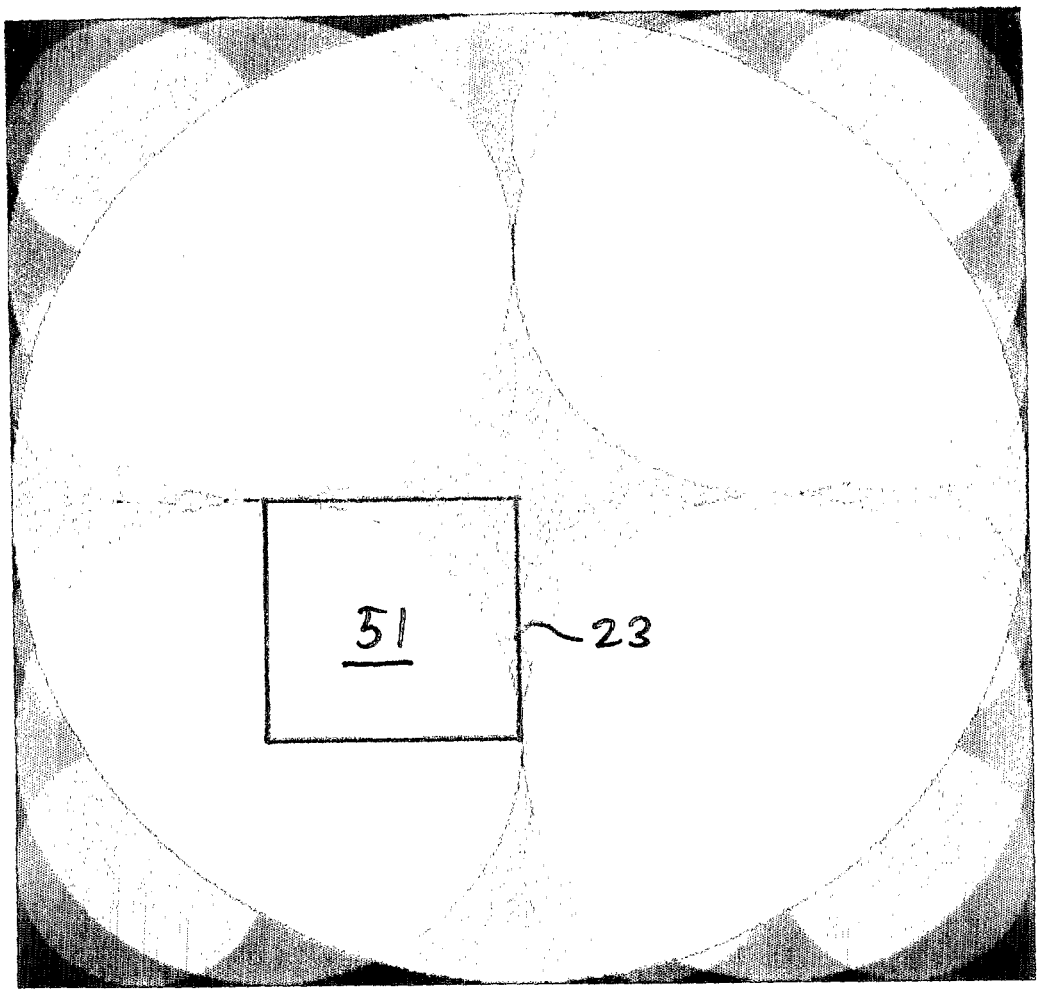
Figure 21:
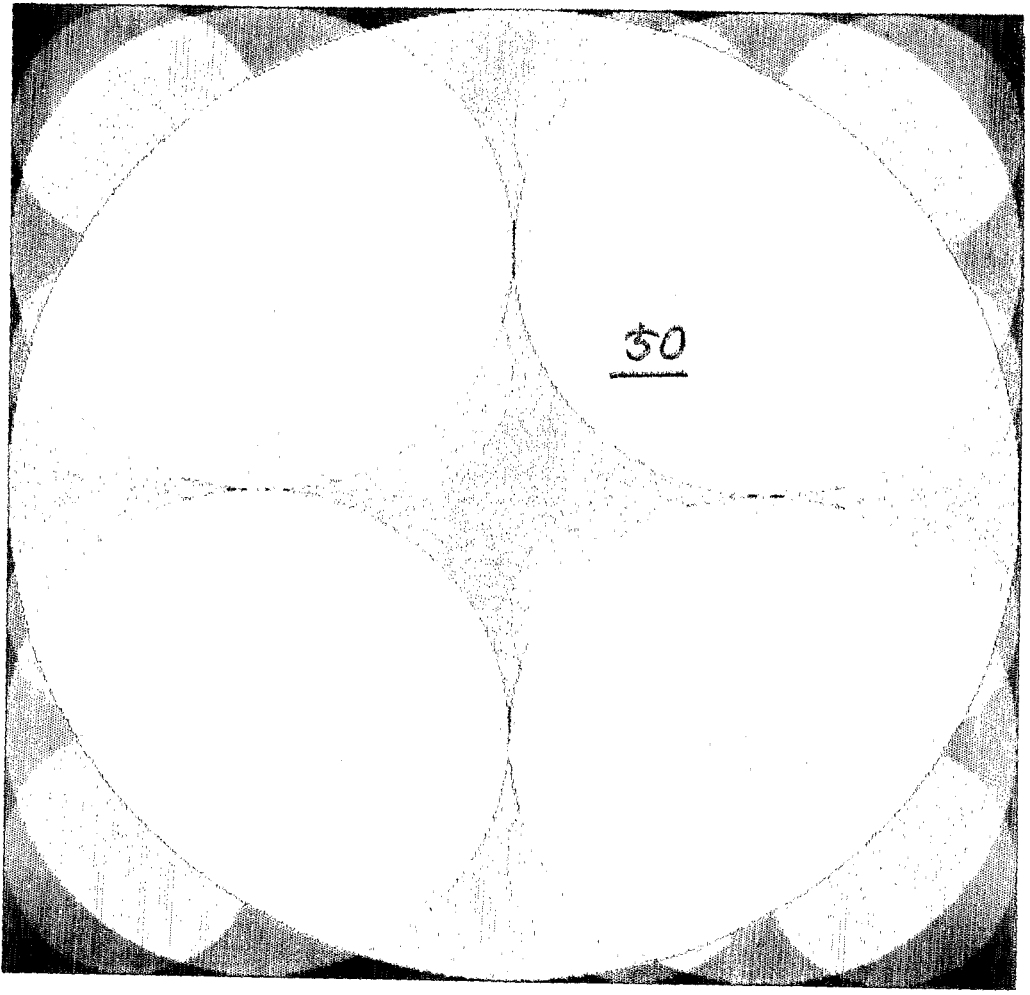

FIG. 18 shows the sum of these various layers. This very simple example allows to clearly visualizing the basic forms of each level. FIG. 19 illustrates a sum of the same type but for a higher number of levels, therefore a higher number of node-objects, resulting in a more complex structure in this example.

EXAMPLES OF MODIFICATIONS

FIGS. 20 to 23 illustrate examples of modifications of maps which it is possible to provide using the method and the tools according to the invention. On FIG. 20, the mobile frame 23 of the node selection tool 20 is localized on a node-object 51 to be processed. The following figure illustrates the result following the suppression of this node. One clearly sees that the modifications can thus be made on a local level, without affecting the remainder of the map.

Figure 22:
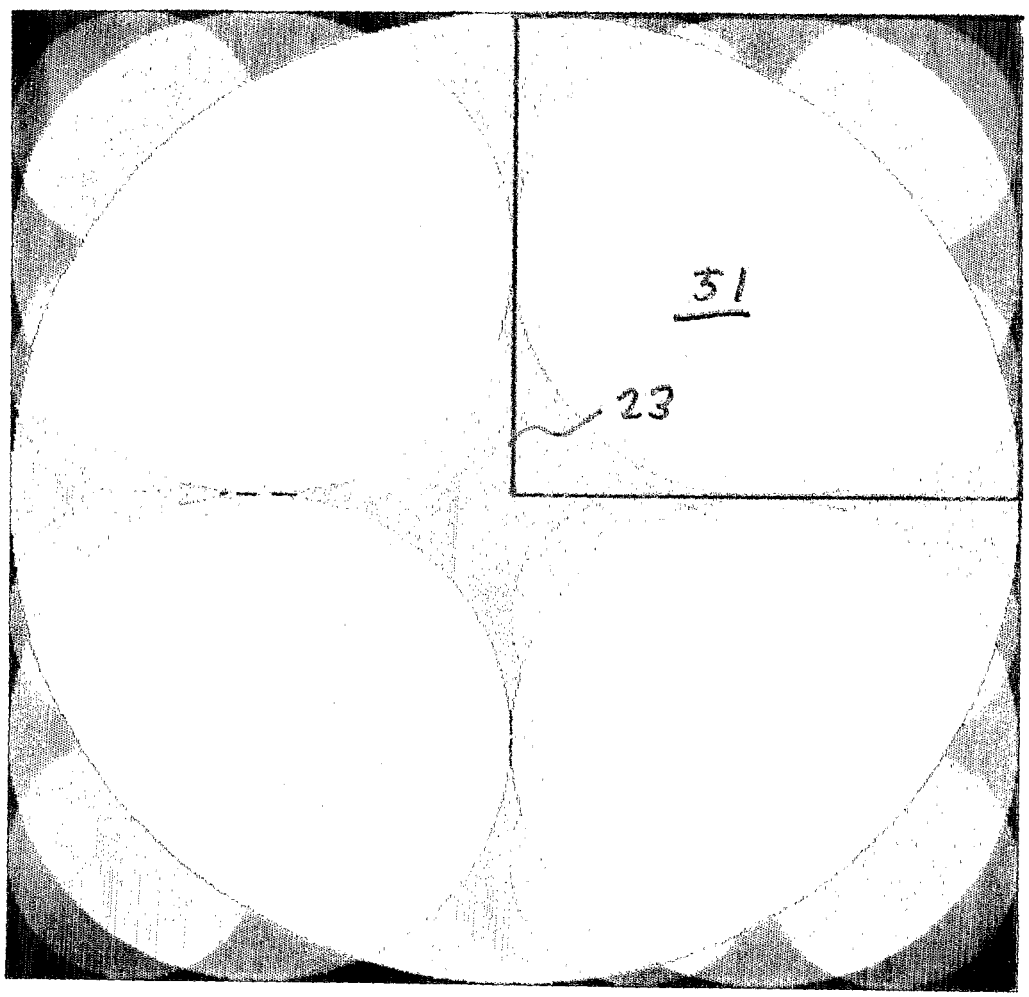
Figure 23:
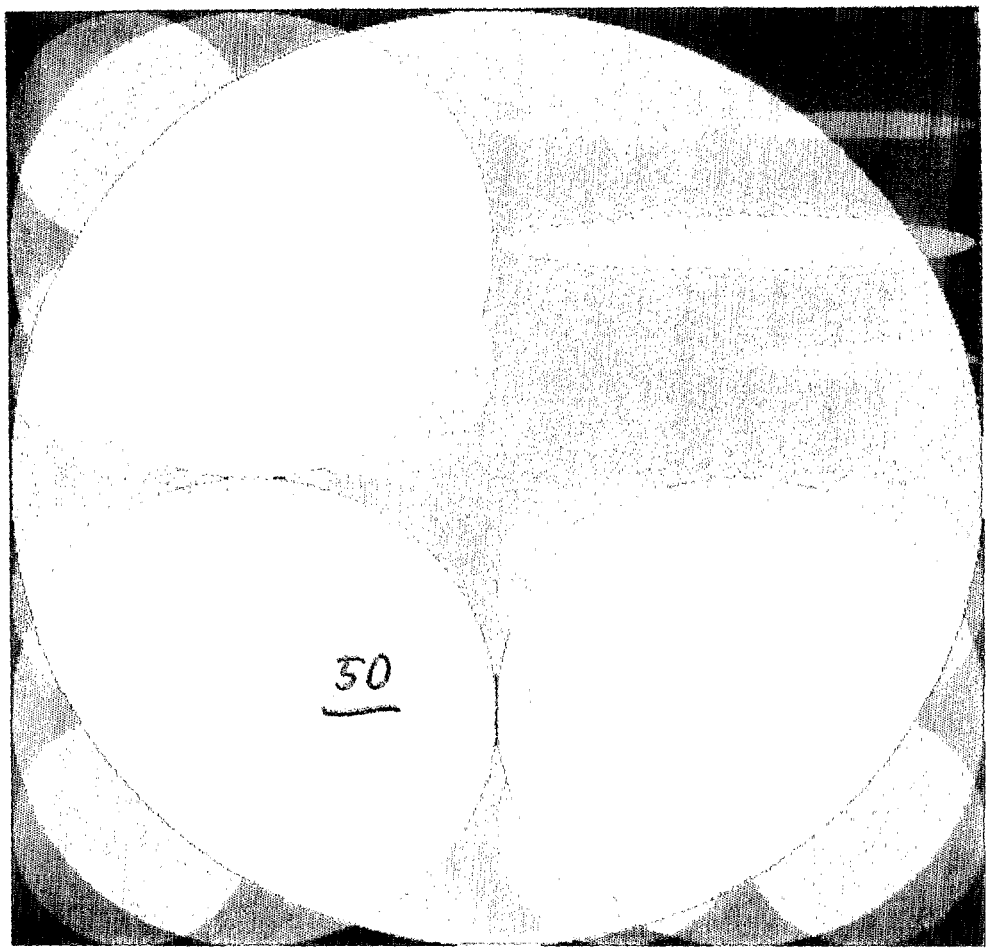

FIGS. 22 and 23 illustrate a similar process of modification of the parameters at the node level. In this example, the function or morphlet F was modified, thus affecting the basic form of the node-object of this quarter of the map. Indeed, one sees on FIG. 23 the discs of FIG. 22 which are now thinned or crushed.

FIG. 1 illustrates an example of working interface obtained by a tool 10 according to the invention. According to various variants of realization, such a tool can be provided either for the modification of existing procedural maps, or for the generation and the modification of such maps.

The basic tool comprises a tool 20 for selection of nodes, including a selector 21 of level J, and a selector of node, allowing the selection of a given node in the selected level. In practice, as described hereafter, the user selects a layer, corresponding to a given level J and a node-object, corresponding to a node K.

Tool 10 comprises a tool for parameter setting 30, allowing selecting a parameter, either to set a first value for it, or to modify it or adjust it, according to the case. To modify a map, one or more nodes 41 are first of all selected. A tool such as a node selector 20 offers this possibility. Such a tool can advantageously provide two functions: a level selection unit 21, and a node selection unit.

The tool for node selection comprises a mobile screen target 23. This screen target is advantageously configured in order to allow the delimitation of at least one node-object 51 in a given layer. In the illustrated examples, the target is of substantially square form. To facilitate the selection of the nodes, the tool comprises a displacement mode in order to allow the auto positioning of the target on an node-object or a set of node-objects, for example the nodes that are the closest, when the target is not perfectly positioned by the user on a node. The target may be operated by any type of traditional computer command, such as a mouse, a pointer, keyboard keys such as the arrows, or a remote control such as a machine, an especially designed circuit or command software. It can also be controlled directly from the node selection tool interface 20, for example using a cursor 24 controlling the displacement of the target 23 on the map.

Advantageously, the tool 23 is configured so that when a level is selected, the shape and the size of the frame 23 adapt to those of node-object 51 of the corresponding level. The tool 23 allows selecting any node of the selected level.

According to another variant, the node selection tool 20 comprises an indication means, allowing to clearly indicate to the user which nodes are selected. Such an indication can be provided by a change of color or intensity, a flickering, or any other effective visual means.

Tool 10 preferably comprises a depth selector 26, allowing the user to indicate if the operation in progress relates only to the nodes of the selected level or if the sub-trees must also be processed in a similar way.

The parameter setting tool 30 first allows the selection of a parameter to be considered. Then, its value (modified or initial) may be entered. The tool is advantageously adapted in order to be able to process at least one, but preferably all the types of parameters illustrated in this document, such as: F: 34, H: 35, ξ: 36, p: 33, D (x): 31, D (y): 32.

The example illustrated on FIG. 1 allows two modes of entry of parameters. First of all, an internal mode. When the mode selector internal/external 38 is on the position "in", an internal tool, integrated into the interface, allows setting a value to the selected parameter. For example, on FIG. 1, one sees that the mode selector of the parameters F, ξ and p are in internal position. The interface then allows the user to give a value to the various parameters. For example, for F, the user enters a function, such as that illustrated. According to an alternative, a pull-down menu can propose the user a series of functions among which he can choose. It is the same for the parameter ξ. For the parameter p, the user gives a value, for example between 0 and 1, for example using a cursor or another similar tool. A pull-down menu can also be proposed. For the parameters H and D (for x and y), if the user chooses the internal mode, the values can be entered in a way similar to that of the parameter p, with values for example between 0 and 1 for H, and expressed as a percentage for D.

For the parameters having to receive their value from an external source, the user chooses which type of external parameter he wishes to consider. For example, for a digital image, he may wish the level of one or several colors; a gradient, such as the value of the gradient in a given point according to a given vector; a value of brightness, the value of the Laplacian in a given point; the distance or the variation compared to a color of his choice, etc. An external parameter selector 39, such as for example a pull-down menu, allows the user to select the external parameter of his choice.

A pointer or cursor can supplement the tool, for example to allow the user to point a given portion of an image where he wishes to consider the parameter in which he has interest.

One or more accessors are advantageously provided in order to allow the conversion of the values of the external parameters into values adapted to the parameters F, H, ξ, p and D.

According to a nonillustrated alternative, only one mode could be present, namely the external mode. In such a case, either the parameters have a fixed value, or they receive a value from an external source. There is then no mode selector.

Figure 4:
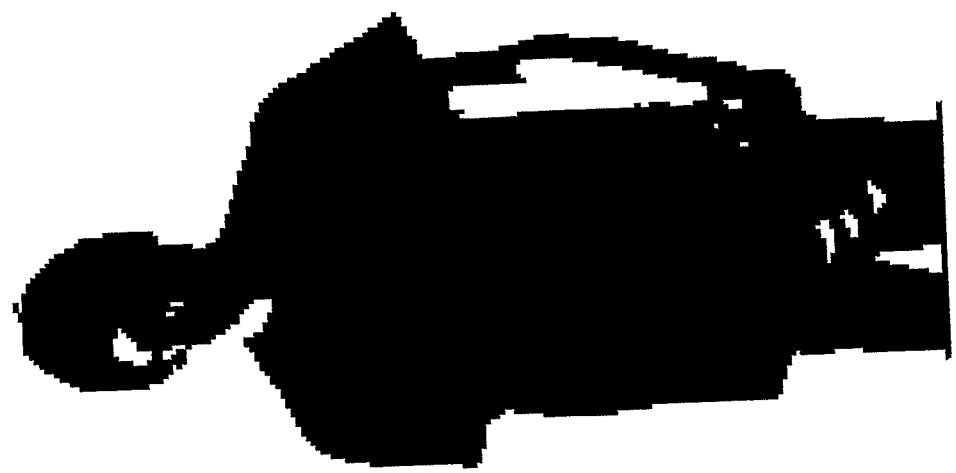
FIG. 4 shows a basic image potentially usable as an external source from which parameters may be extracted in order to create or modify procedural maps according to the invention.
Figure 5:
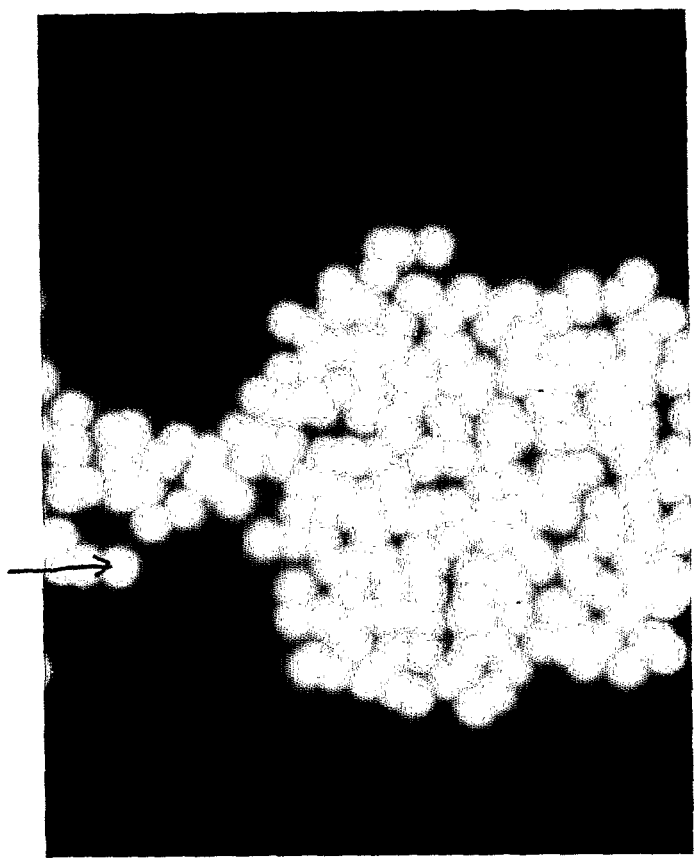
FIGS. 5 and 6 illustrate an example of a map produced using the basic image of FIG. 4 to provide one or more parameters. The arrow indicates a node-object which is the subject of a modification (a short distance displacement) between FIG. 5 and FIG. 6.
Figure 6:
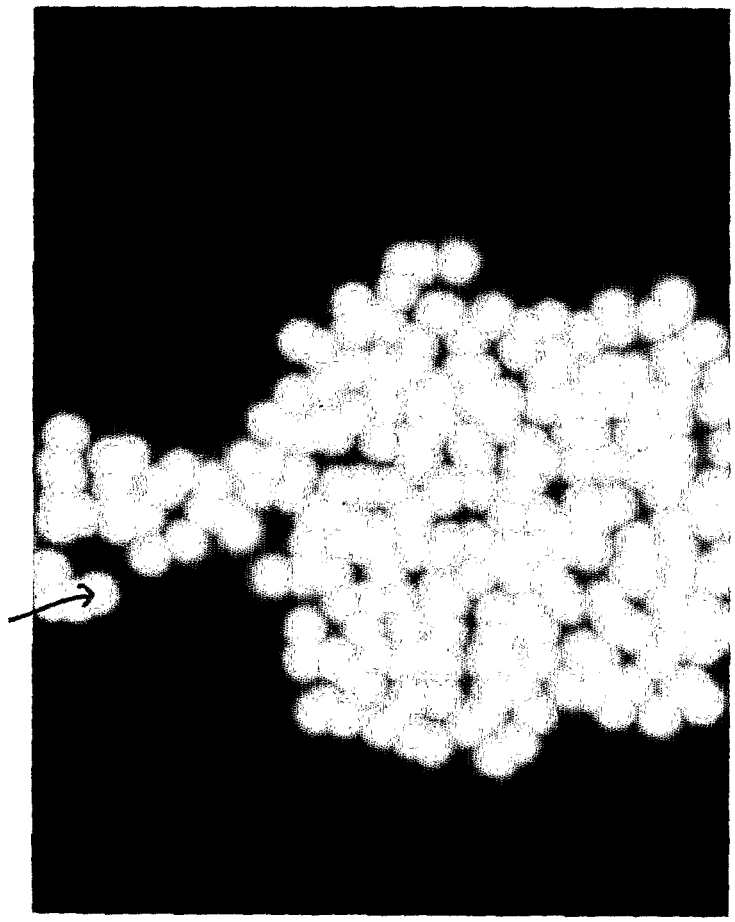
Figure 7:
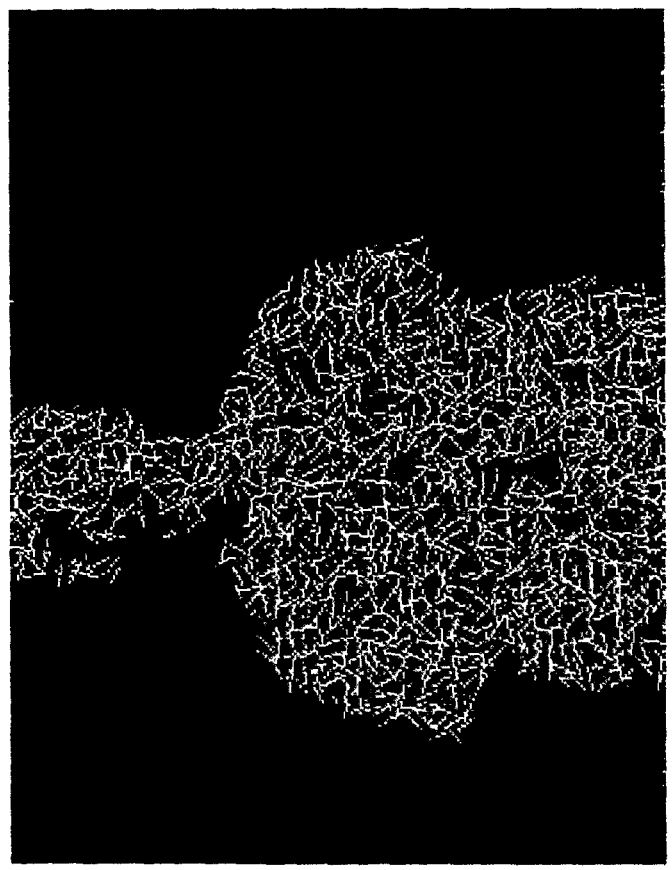
FIGS. 7 and 8 illustrate other examples of maps produced using the basic image of FIG. 4 in order to provide one or more parameters.
Figure 8:
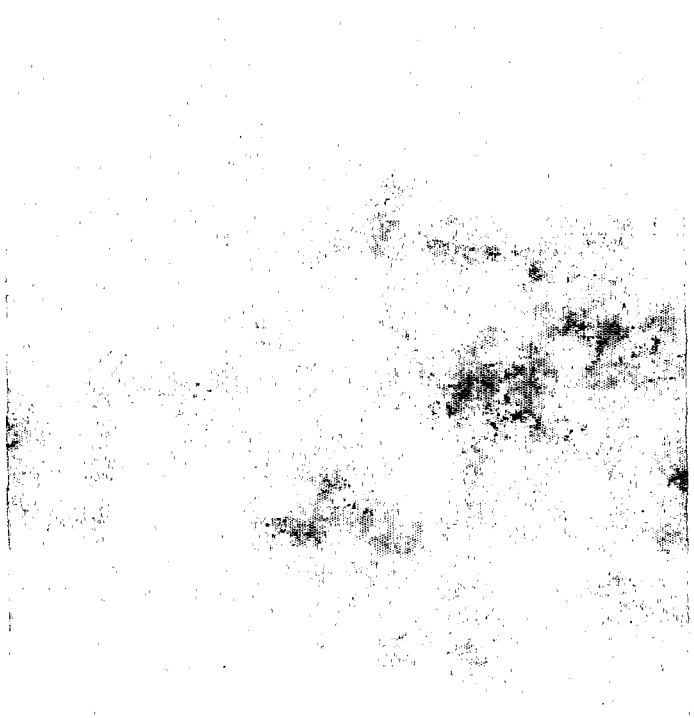

FIGS. 5 and 6 illustrate an example carried out with the method and tools according to the invention. These procedural maps were parameterized (at least partly) from the basic image of FIG. 4. The map of FIG. 6 is the same one as that of FIG. 5, except at the place indicated by the localization arrow, which indicates a node-object which was slightly moved on FIG. 6 compared to its position on FIG. 5. FIGS. 7 and 8 illustrate other types of maps, also generated from parameters of the basic image of FIG. 4. One thus sees that the possibilities of parameter setting are very large, even from only one basic image.

Tool 10 preferably comprises a Global (G)/Local (L) selector. The Global mode is selected using selector 37 if one wishes to modify an entire map. The level and node selection units can then be deactivated or not used. The modifications are carried out as described beforehand, but the user has the possibility to apply these modifications to an entire map. Of course, he can carry out certain modifications of the same map in Local mode, and others in Global mode. In Global mode, the steps relating to level and node selection are obviously not applicable.

The local modifications imply that the modifications are integrated into the level of the node-objects, for at least one node-object.

Tool 10 can also allow the possibility of removing one or more nodes. A "virtual" suppression can also be made by using a morphlet F=0.

The method as well as the tools presented within the framework of this invention have been presented with simple images and maps. The same method and the same tools apply in a similar way to series of images such as video sequences.

The invention claimed is:

1. A process to modify an image processing procedural map having a tree structure comprising a plurality of levels, each one with at least a node to which is associated at least one modifiable parameter, comprising the steps of:
    establishing an at least temporary connection with an external source capable to provide at least one input value of at least one parameter to be applied to at least one modifiable parameter of at least one node of said image processing procedural map for a modification of a previous value of said modifiable parameter;
    parameterizing a procedural map with sub-steps consisting in:
    providing a node selection tool, allowing selection of at least one node of at least one level of the tree structure;
    receiving the selection of at least one node, of at least one level of the procedural map to be modified, to which the input value of external parameter is intended;
    providing an external parameter selector, allowing selection of a type of external parameter;
    providing a parameter modification tool allowing modification of the value of at least one parameter of the at least one selected node, by an input value of the selected type of parameter from the external source;
    applying said input value of the external parameter to the selected at least one node; and
    processing said procedural map, including node parameter modified with the input value, in order to generate said modified image procedural map having a tree structure;
    wherein the tree structure includes nodes (j, k) in which j is a current level and k is a displacement vector for each node;
    wherein the type of input external parameter is selected in a list comprising: a "morphlet" F, a maximum number of levels (jmax), a Hurst parameter (H), a random number ($\xi$), an intermittency parameter (p), and a displacement value (D); and wherein at least one accessor is provided to allow a conversion of the external parameter value into a value adapted to said node parameters.

2. The process of claim 1, in which said map thus provided, is a locally modifiable image processing procedural map having a tree structure.

3. The process of claim 1, further comprising:
receiving a selection of at least one other node, from at least one level;
receiving a selection of at least one parameter of the at least one other node;
applying a new value for the at least one other node;
generating the map according at least to these values.

4. The process of claim 1, in which the procedural map having a tree structure can be represented by an equation of the type:

$$\Sigma F(2^j x - k)$$

$(j, k) \in T$ in which:
F is a function (or "morphlet") $R^n \rightarrow R$
x is a vector of the type $(x1, x2, \ldots, xn)$;
T is a tree comprising the nodes $(j, k)$ and in which
j represents the selected level, among a total number of potential levels jmax ($j \in (0, 1, 2, \ldots, jmax)$
k is a displacement vector for each node N, of the type $(x1, x2, xn)$.

5. The process of claim 1, in which the map may be represented by an equation of the type:

$$\Sigma 2^{-jH} F(2^j x - k) \xi_{(j,k)}$$

$(j, k) \in T_{D, p}$ in which:
F is a function (or "morphlet") $R^n \rightarrow R$
x is a vector of the type $(x1, x2, \ldots, xn)$;
TD, p represents a tree structure provided with an intermittency parameter (p), comprising nodes $(j, k)$, and a displacement value (D), in which
j indicates the selected level, among a total number of potential levels jmax ($j \in (0, 1, 2, \ldots$ jmax)
k is a displacement vector for each node N of the type $(x1, x2, \ldots, xn)$
H represents a value of roughness;
$\xi$ represents a random number.

6. The process of claim 1, in which the parameters are affected in a recursive way to children nodes of the selected nodes.

7. The process of claim 1, in which the map is time dependant.

* * * * *